(12) United States Patent
Gutiérrez Araújo (10) Patent No.: US 11,951,646 B2
(45) Date of Patent: Apr. 9, 2024

(54) WOODEN STAVE AND BARREL FOR DRINKS

(71) Applicant: Valchedor Cask S.L., Castilla y León (ES)

(72) Inventor: Iván Gutiérrez Araújo, Madrid (ES)

(73) Assignee: VALCHEDOR CASK, S.L., Castilla y León (ES)

(*) Notice: Subject to any disclaimer, the term of this patent is extended or adjusted under 35 U.S.C. 154(b) by 385 days.

(21) Appl. No.: 17/291,195

(22) PCT Filed: Oct. 21, 2019

(86) PCT No.: PCT/ES2019/000064
§ 371 (c)(1),
(2) Date: May 4, 2021

(87) PCT Pub. No.: WO2020/094893
PCT Pub. Date: May 14, 2020

(65) Prior Publication Data
US 2022/0001571 A1    Jan. 6, 2022

(30) Foreign Application Priority Data

Nov. 6, 2018 (ES) .......................... ES201800625U (51) Int. Cl.
*B27H 5/02* (2006.01)
*B27H 3/02* (2006.01)

(52) U.S. Cl.
CPC ................ *B27H 5/02* (2013.01); *B27H 3/02* (2013.01)

(58) Field of Classification Search
CPC ... B65D 9/04; B65D 1/16; B27H 5/02; B27H 3/02; C12G 3/07; C12H 1/22
See application file for complete search history.

(56) References Cited

U.S. PATENT DOCUMENTS

| 481,350 A | 8/1892 | Forster |
|---|---|---|
| 2,389,438 A | 11/1945 | Knox |

(Continued)

FOREIGN PATENT DOCUMENTS

| CN | 104640779 A | 5/2015 |
|---|---|---|
| ES | 2 389 438 T3 | 10/2012 |

(Continued)

OTHER PUBLICATIONS

International Search Report for PCT/ES2019/000064 dated Feb. 7, 2020 (PCT/ISA/210).

*Primary Examiner* — Shawn M Braden
(74) *Attorney, Agent, or Firm* — Sughrue Mion, PLLC (57) ABSTRACT

A wooden stave and barrel for the maturing or storage of alcoholic or spirit drinks, in which the internal side of the stave is machined to have at least two first channels and at least two second channels crossing with the first channels, determining a pattern of geometric elements. The elements remain submerged in the liquid contained in the barrel, providing a greater contact surface, thereby producing a greater transfer of the substances of the wood itself to the liquid. In addition, the pattern formed by the crossing channels permits a continuous and obstruction-free path for the liquid when it is extracted through one of the staves with an opening for the entry and exit of the liquid inside the barrel, thereby preventing unnecessary losses and unwanted internal residue for future reuse of the barrel.

24 Claims, 8 Drawing Sheets (56) References Cited

U.S. PATENT DOCUMENTS

| | | | | |
|---|---|---|---|---|
| 4,484,688 A | 11/1984 | Smith | | |
| 6,378,419 B1* | 4/2002 | Ecklein | ............... | C12G 3/07 |
| | | | | 99/277.1 |
| 9,212,343 B1* | 12/2015 | Karasch | ............... | C12H 1/12 |
| 2011/0000885 A1* | 1/2011 | Kenealy | ............... | B65D 9/34 |
| | | | | 147/35.5 |
| 2017/0283753 A1 | 10/2017 | Verdier et al. | | |
| 2020/0190451 A1 | 6/2020 | Molnar | | |

FOREIGN PATENT DOCUMENTS

| | | |
|---|---|---|
| ES | 2 635 587 A1 | 10/2017 |
| FR | 925369 A | 9/1947 |
| FR | 3 049 615 A1 | 10/2017 |
| GB | 25843 A | 4/1914 |
| RU | 2 536 185 C2 | 12/2014 |
| WO | 2012/175097 A1 | 12/2012 |

* cited by examiner

WOODEN STAVE AND BARREL FOR DRINKS

CROSS REFERENCE TO RELATED APPLICATIONS

This application is a National Stage of International Application No. PCT/ES2019/000064 filed Oct. 21, 2019, claiming priority based on Spanish Patent Application No. U201800625 filed Nov. 6, 2018.

OBJECT OF THE INVENTION

The present invention relates to a wooden stave and a barrel for drinks formed by staves, and in particular for alcoholic or spirit drinks.

The invention falls within the sector of the manufacturing of barrels intended for the maturing and storage of alcoholic or spirit drinks, such as wine or whiskey.

BACKGROUND OF THE INVENTION

Currently, there is a search for solutions to particularise alcoholic or spirit drinks, said particularisation consisting of giving the drinks new aromas, flavours or colours. This particularisation must be performed in wooden barrels for the maturing or storage thereof such that they obtain the recognition of the competent persons, bodies or organisations as well as the market. For this reason, different barrel solutions have arisen to achieve more complex results in the search for new aromas, flavours or colours in the drinks.

One of the solutions proposed in the state of the art is to increase the contact surface between the liquid and the inside of the barrel by means of various systems. With this, the maturing of the liquid contained inside these barrels is faster than in the barrels with the contact surface being smooth, since the liquid receives a greater amount of substance coming from the wood, which will give it more intense colours and aromas, in addition to accelerating the maturing process of the liquid contained. Among the different solutions we find the immersion of various wooden structures inside the barrel during the maturing process of the liquid. Patent documents FR2504498A1, ES2194601A1, FR2864965A1 and US20160097023A propose the use of wooden structures or elements inside barrels.

For these cases in which independent structures from outside the barrel staves are introduced, there is reluctance from some organisations such as the Scotch whisky Association (SWA), considering that introducing elements or structures inside the barrel is contrary to the classic style of whiskey creation, which does not allow the use of the designation of origin "Scotch whisky" for the maturing of whiskey with this type of barrel.

Another solution that has been proposed for a few decades is to increase the contact surface of the barrel through different grooves made in the internal surface of the walls of the barrel, that is to say, the one which is in direct contact with the liquid. This contact surface is the one formed by the internal side of each of the parts making up the barrel and are called staves. Therefore, we find transverse cuts, longitudinal cuts, or circular cavities on the internal side of the staves, and in some cases even a combination of both. In patent documents U.S. Pat. No. 3,372,633, U.S. Pat. No. 3,842,723, WO2012/175097A1, U.S. Pat. No. 9,212,343 and GB2549202A1 different solutions are proposed to increase the internal contact surface of the barrel with the liquid.

In these cases, the solution does not represent a significant improvement due to the little additional contact surface obtained and the existing limitations for the execution thereof. An additional problem with this type of solution is found in the extraction of the liquid from the barrel, since accumulations of said liquid are produced in the different perforations. These accumulations cause a loss of the total volume of the resulting liquid as well as unwanted storage of liquid inside the barrel. This aspect can be especially important in the case of drinks which require the use of several barrels and the combination of various liquids in the process thereof, since stagnant residues of the liquid preceding the one to be introduced into the barrel could be found in the barrel, since the barrel may not have been completely emptied. In this manner, results which are uncontrolled or unwanted and in some cases not allowed would be created. This would be the case, for example, of "Scotch whisky", wherein the barrel used for the maturing of the liquid has previously housed oloroso wine or sherry inside for approximately two years, for which reason there would be the problem of having residual liquid from said oloroso wine or sherry inside the barrel when filling with the freshly distilled whiskey. This is something "The Scotch Whisky Association" (SWA) does not allow.

Therefore, a solution seems necessary which combines an increase in the contact surface that would be feasible in the execution thereof in order to achieve a considerable increase in the attributes granted to the contained liquid, and which at the same time solves the problems indicated in terms of the complete emptying of the barrel, thereby preventing product losses and the accumulation of liquids prior to the process of making the resulting liquids.

DESCRIPTION OF THE INVENTION

The present invention, wooden stave and barrel for the maturing or storage of alcoholic or spirit drinks, refers to a stave which has a first machining for hollowing or removing material at the ends of the internal side thereof where the lid of the barrel will be located and where there will be an area outside the barrel and a second machining in the remaining surface of the internal side thereof corresponding to the area which will remain inside the barrel, comprising at least two first channels and at least two second channels crossing with the first channels, determining a pattern of geometric elements. After joining several staves with the previous machining for the formation of a barrel, the geometric elements will remain submerged in the liquid contained in the barrel, having a greater contact surface between the material of the stave, wood, and the stored liquid, thereby producing a greater transfer of the substances of the wood itself to said liquid. In addition, the pattern formed by the crossing channels permits a continuous and obstruction-free path for the liquid when it is extracted through one of the staves with an opening inside the barrel for the entry and exit of the liquid, thereby preventing unnecessary losses and unwanted internal residue for future reuse of the barrel. Said pattern is preferably adapted and arranged parametrically to the shape of the internal side of the stave, according to the requirements of the manufacturing process, the requirements of the drink to be stored inside the barrel or the needs of the end customer, in order to optimise the function thereof in the curvature conditions, which the stave will have in the end once the barrel is configured. Therefore, a first object of the invention is a stave according to claim 1.

Specifically, the stave object of the present invention is a wooden stave for a barrel intended for the storage and/or maturing of alcoholic or spirit drinks. Said stave has a side at each of the two ends thereof joined together, by an internal side, an external side and by two longitudinal sides, which determine the length of the stave, comprising on the internal side thereof, a flat surface resulting from a treatment for hollowing or removing material and corresponding to the area which will contain the lid and the area which will remain outside the barrel, at least two first machined channels and at least two second machined channels which cross with said first channels, on the remaining surface of said internal side and corresponding to the area which will remain inside the barrel once made, forming a pattern determined by said crossing channels and formed by geometric elements located between the channels, such that the stave has a first internal surface at the bottom of the channel, a second internal surface corresponding to the top of the geometric element and a third internal surface corresponding to the ends thereof and coinciding in level with the first surface, the difference between both heights determining the depth of the channels, such that the difference between the first and the third internal surfaces with the external side determines the base of the stave. The longitudinal sides of the stave can be straight as an alternative to being curved, depending on the construction conditions of the barrel.

In addition, if necessary due to manufacturing requirements, the stave may have a profiling treatment on the contour or perimeter thereof, and more specifically on the two longitudinal sides thereof in order to obtain the shape of the internal side of the stave, on which the different machining treatments will subsequently be performed. The purpose of said treatment is to reduce the width of the stave at the ends thereof in order to facilitate the assembly thereof in the barrel. Once said treatment has been performed, the two longitudinal sides of the stave can be rectilinear or curved, as established in the manufacturing requirements of the barrel.

A first machining of the internal side of the stave will be performed in the area which will contain the lid and the area which will remain outside the barrel corresponding to the ends of said stave. This machining will be for hollowing or removing material, with the objective of the stave having in that area the final thickness that the base thereof will have, with a normalised or standardised thickness of said base of approximately between 2 and 3 cm.

A second machining in the remaining area of the internal side of the stave and corresponding to the internal surface of the barrel once formed, for the formation of said pattern with geometric elements, is preferably performed by means of numerical control, such that the pattern, and the geometric elements forming it, is the result of the cuts created in the machining process, for which reason the final effect of said stave will be the extrusion of elements perpendicular to the treated surface, erected on the base of the stave, with a normalised or standardised thickness of said base of approximately between 2 and 3 cm. Said pattern enables a considerable increase in the contact surface of the wood with the contained liquid, at the same time that it offers the possibility of a flow without barriers when the barrel is emptied, thereby preventing the loss and accumulation of liquid inside said barrel. For the emptying and filling of the barrel formed by several staves, one, or at least one, of said staves comprises a through opening located approximately in the centre of the stave, interrupting at least one first channel of the stave, such that the liquid moves through the different connected channels of the different staves until it reaches the exit opening, located in the stave on which the barrel rests or in one of the ones adjacent to it.

In order to achieve the objective of emptying, different pattern options are had which are always determined by at least two first channels and at least two second channels, which cross with said first channels, such that the arrangement of the channels on the internal side of the stave gives rise to different geometric elements forming the pattern of the internal side of the stave. Said pattern is adapted and arranged on the internal side of the stave preferably parametrically, parametric being understood as that design process which is based on an algorithm flowchart, which enables parameters and rules to be directed which define and organise the relationship existing between the design requirements and a final design product of this process. This paradigm of the design seeks to manipulate in infinite manners the possibility of organising or modelling a material through the simple geometries by creating complex structures. Due to the fact that the wooden stave preferably has a smaller width at the ends thereof with respect to the central point thereof, the two longitudinal sides thereof preferably being curved, said pattern adapts to the perimeter or contour had by the internal side of the stave, optimising the function thereof in the curvature conditions, which the stave will have in the end once the barrel is configured. Some alternatives are included in claims 4 to 13.

In order to achieve these geometric elements machined on the internal side, it is necessary to start with staves having a thickness greater than approximately 2 to 3 cm, which is the usual thickness of the staves in the state of the art. This additional thickness will determine the height of the geometric elements resulting from the machining of the channels and which configure the pattern on the internal side of the stave. As mentioned above, the height of the geometric elements determines the depth of the channels, the stave having a first internal surface at the bottom of the channel, a second internal surface corresponding to the top of the geometric element and a third internal surface corresponding to the ends of the stave and coinciding in level with the first surface, the difference between both heights determining the depth of the channels and the height of the geometric elements.

This height of the elements, or depth of the channel, may vary according to the properties of the wood, requirements of the drink to be stored inside the barrel or the needs of the end customer. It must be taken into account that the height of the geometric elements has a maximum height which is determined by the curvature of the stave when it forms the barrel, since said elements resulting from the machining, being perpendicular to the base thereof and being contained in the curved surface resulting from the execution of the barrel, could collide with each other starting at a certain height, this being a situation to be prevented. In addition, the channels resulting from the machining can have different widths, depending on the cutting tool or cutter used for the machining, determined by the construction requirements. The channels can have the same or different widths. The depth of the different channels may be equal, different depending on the channel or even vary in one and the same channel.

A second object of the invention is a barrel according to claim 19. The barrel is made up of several staves and two lids, having at least one stave with the internal configuration described above. In addition, the stave with the opening for the entry and exit of liquid in the barrel may or may not incorporate the internal configuration described above.

Due to the machining performed in the internal surface of the stave, more specifically in the area corresponding to the one which will remain inside the barrel once formed, the internal fibres of the wood are exposed to the liquid contained inside the barrel, which provides said barrel with a greater capacity to transmit substance from the wood to said liquid.

The solution proposed in the present invention is compatible with the different toasting or fire exposure treatments that wooden barrels are usually subjected to. Toasting can be carried out by means of current systems, wherein the barrel is subjected during the execution process thereof to the exposure of a fire which grants these characteristic properties to the wood. The staves can also be toasted individually in order to then be assembled together to form the final barrel.

The staves will have the established finishes which are performed in the forming and finishing of the barrel.

To this end, the present invention focuses on the creation, by means of machining, of efficient geometries in the internal surface of the staves which form the barrel, such that they enable a complete emptying of the liquid contained inside the barrel, thereby preventing liquid waste contained in previous uses of the barrel, while offering greatly improved conditions for increasing contact surface.

DESCRIPTION OF THE DRAWINGS

The figures accompanying the following description show different alternatives of carrying out the invention.

DESCRIPTION OF PREFERRED EMBODIMENTS

Different alternatives for the embodiment of the invention are described below with reference to the aforementioned figures.

The invention refers, as mentioned above, to a stave 20 which has on the internal side thereof a first machining for hollowing or removing material at the ends of the internal side thereof where the lid of the barrel will be located and where there will be an area outside the barrel, preferably performed by numerical control and a second machining in the remaining surface of the internal side thereof corresponding to the area which will remain inside the barrel, preferably performed by numerical control, comprising at least two first channels and at least two second channels crossing with the first channels, determining a pattern of geometric elements. These patterns can vary depending on the number of channels and the trajectories or directions thereof. The machining of the internal side of the stave 20 is determined by a first internal surface 29 corresponding to the bottom of the channel, a second internal surface 28 corresponding to the top of the geometric element 7 and a third internal surface 4 corresponding to the ends thereof and coinciding in height with the first internal surface 29, the difference between both heights determining the depth of the channels. In addition, the difference between the first internal surface 29 of the stave 20 and the third internal surface 4 of the stave 20, with the external side of the stave 20, determines the base 19 of the stave 20.

Figure 5:
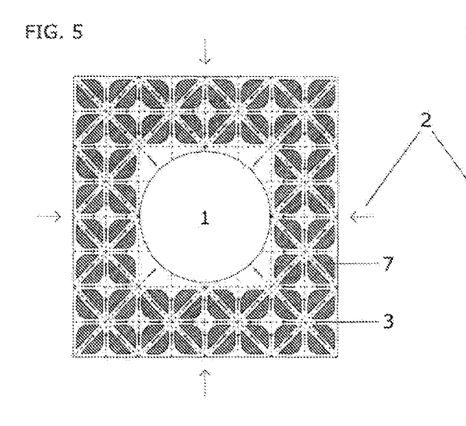
FIG. 5 shows a plan view of a detail of a stave with a first geometric pattern in the meeting point with the entry and exit opening.
Figure 6:
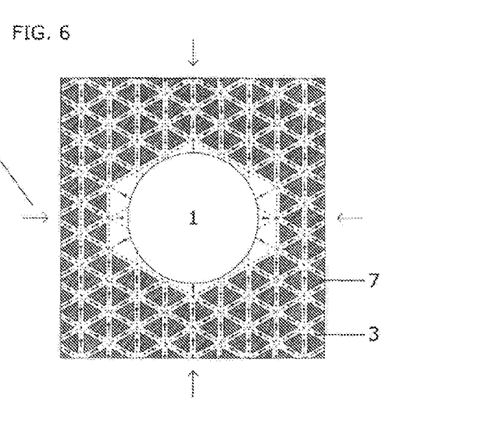
FIG. 6 shows a plan view of a detail of a stave with a second geometric pattern in the meeting point with the entry and exit opening.
Figure 7:
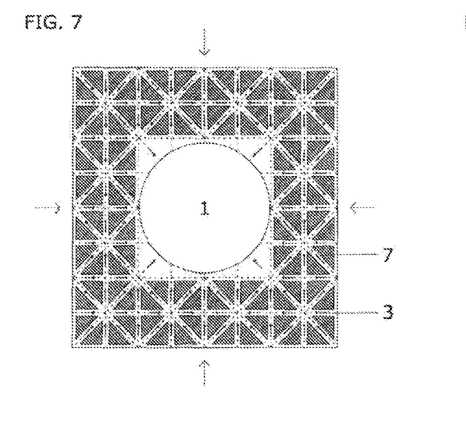
FIG. 7 shows a plan view of a detail of a stave with a third geometric pattern in the meeting point with the entry and exit opening.
Figure 8:
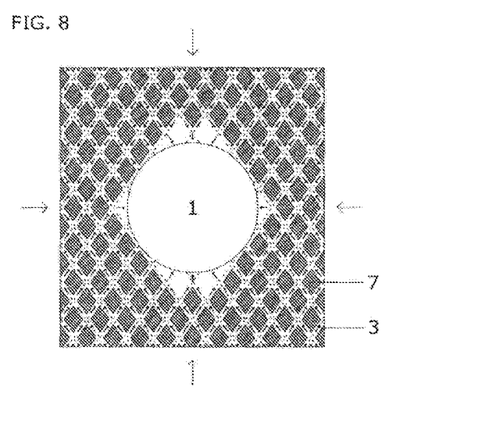
FIG. 8 shows a plan view of a detail of a stave with a fourth geometric pattern in the meeting point with the entry and exit opening.
Figures 9, 10:
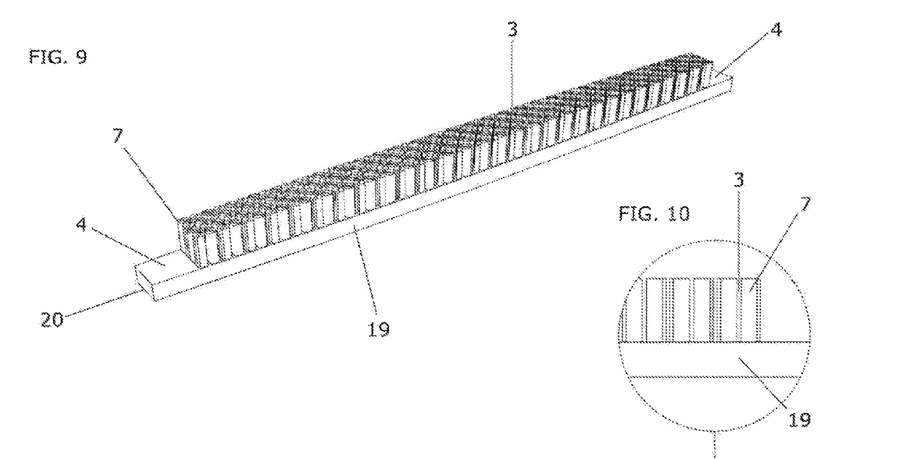
FIG. 9 shows a perspective view of a stave according to the present invention with the geometric pattern of FIG. 1, adapted and arranged parametrically to the perimeter or contour of the internal side of the stave.
FIG. 10 shows an elevation view of a detail of the stave of FIG. 9.
Figure 11:
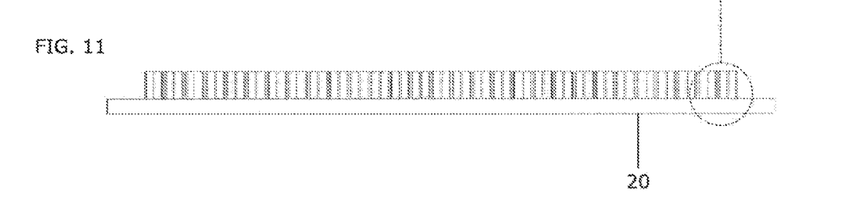
FIG. 11 shows an elevation view of the stave of FIG. 9.
Figure 12:
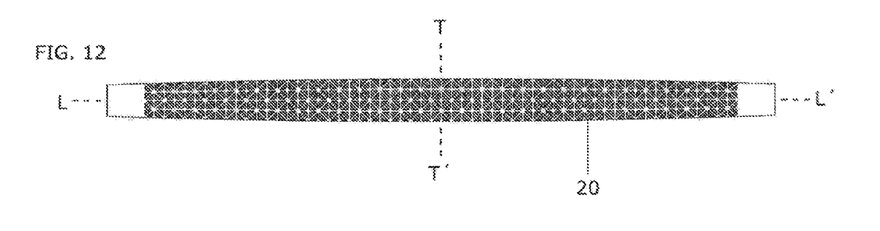
FIG. 12 shows a plan view of the stave of FIG. 9.
Figure 13:
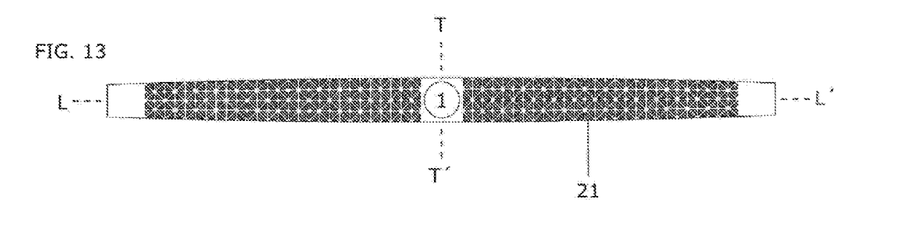
FIG. 13 shows a plan view of a stave with the geometric pattern of FIG. 9 and with an opening for the entry and exit of liquids from the barrel.
Figure 23:
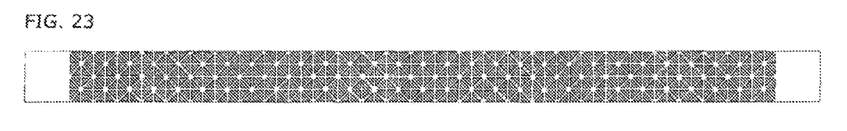
FIG. 23 shows a plan view of a stave with a rectangular shape on the internal side thereof, with the geometric pattern of FIG. 3.
Figure 24:
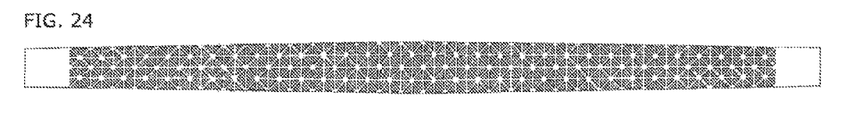
FIG. 24 shows a plan view of a stave corresponding to the geometric pattern of FIG. 3, adapted and arranged parametrically to the perimeter or contour of the internal side of the stave, where the two longitudinal sides thereof are rectilinear.
Figure 25:
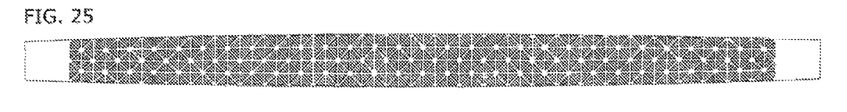
FIG. 25 shows a plan view of a stave corresponding to the geometric pattern of FIG. 3, adapted and arranged parametrically to the perimeter or contour of the internal side of the stave, where the two longitudinal sides thereof are curved.

A first example of a stave 20 resulting from the machining process is shown in FIGS. 9 to 13, in which a wooden stave 20 is seen after the machining of different channels in the internal side thereof. Specifically, the stave 20 shown in FIGS. 9 to 13 has the machining pattern of FIG. 1, adapted and arranged parametrically to the perimeter or contour of the internal side of the stave, although other machining patterns could have been used such as the ones shown in FIGS. 2 to 4, as shown in a second example in FIGS. 20 to 25, where the stave 20 has the machining pattern of FIG. 3, adapted and arranged parametrically to the perimeter or contour of the internal side of the stave. The stave 20 is defined by the base 19 of between 2 and 3 cm thick and the geometric elements 7 resulting from the machining of the channels 3, in said internal side of the stave 20, such that each of these elements 7 are separated from each other by the channels 3, created by the machining tool itself. FIG. 13 shows a stave 21 with the exit opening 1. Specifically, the stave 21 shown in FIG. 13 has the machining pattern of FIG. 5, adapted and arranged parametrically to the perimeter or contour of the internal side of the stave, although other machining patterns could be used such as, for example, the ones shown in FIGS. 6 to 8. FIGS. 23 to 25 show the adaptation of the machining pattern of FIG. 3 to different contour or perimeter options of the stave 20, according to the manufacturing requirements of a stave. Specifically, FIG. 23 has a rectangular perimeter, FIG. 24 has a rectilinear cutting, sanding or machining treatment on the two longitudinal sides 30 and 31 thereof, and FIG. 25 has a curved cutting, sanding or machining treatment on the two longitudinal sides 30 and 31 thereof.

Figure 14:
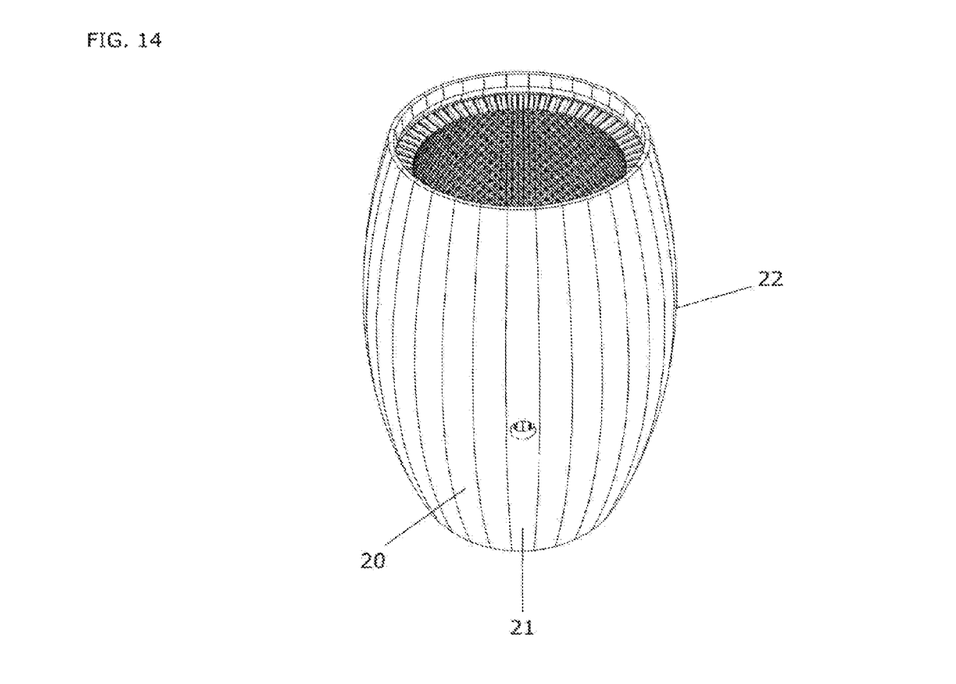
FIG. 14 shows a perspective view of a barrel formed by staves according to FIG. 12 and a stave according to FIG. 13.
Figure 15:
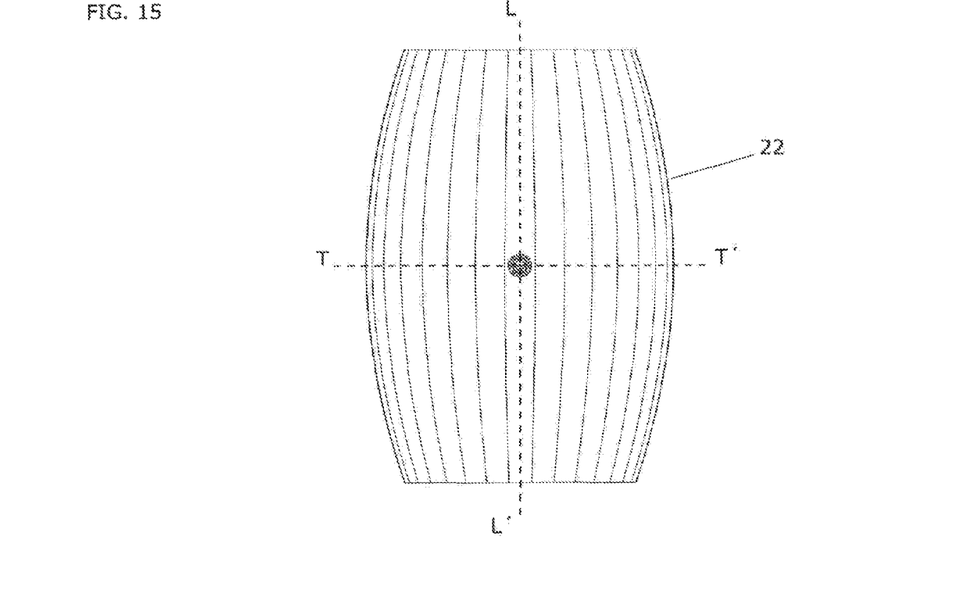
FIG. 15 shows an elevation view of a barrel formed by staves according to FIG. 12 and a stave according to FIG. 13.
Figure 16:
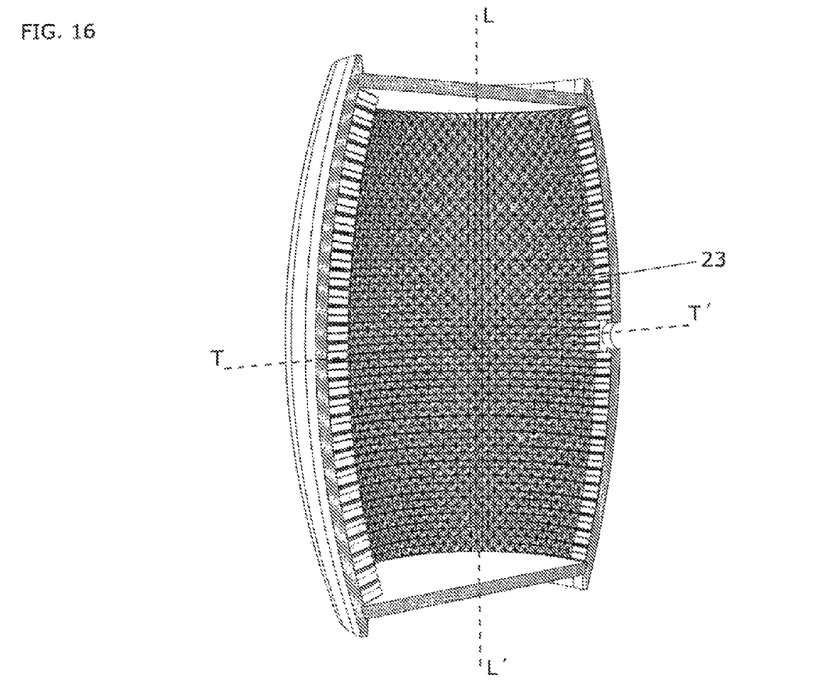
FIG. 16 shows a cross-sectional perspective of the barrel of FIG. 14 located in a vertical position.

Once the staves 20 have been machined and completed, the barrel 22, shown in FIG. 14, is then constructed and formed by said staves 20 and 21. Therefore, the barrel 22 preferably has a single stave 21, with a single exit opening 1 preferably arranged in the centre of the stave 21, between several staves 20 without openings 1.

The result is an internal wall 23 of geometric elements or prisms 7 forming a geometric framework or mesh, (FIGS. 1 to 4) adapted and arranged parametrically to the perimeter or contour of the internal side of the staves forming the barrel, which increase the contact surface between the wood and the liquid contained and enable the total extraction of said liquid from the barrel 22 through the exit opening 1, preventing internal retentions and with this losses of liquid, as well as unwanted accumulated residues.

Figure 17:
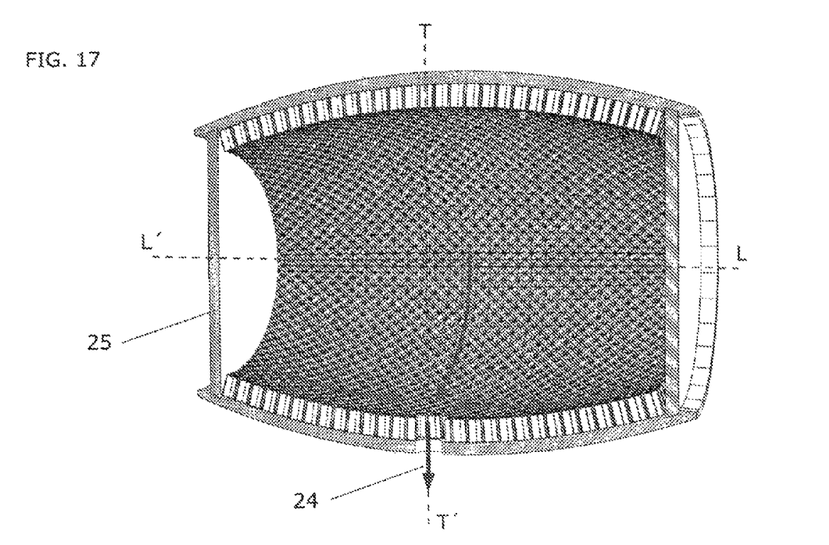
FIG. 17 shows a cross-sectional perspective of the barrel of FIG. 14 located in a horizontal position in the emptying position on the stave with the entry and exit opening of liquid in the barrel.

FIG. 17 shows a cross section of a barrel 22 where the arrows represent the exit 24 of liquid from the barrel 22, an exit which will always be produced through the exit opening 1, continuously and without any type of barrier or cavity which could cause unwanted leaks or accumulations of liquid inside the barrel.

Figure 18:
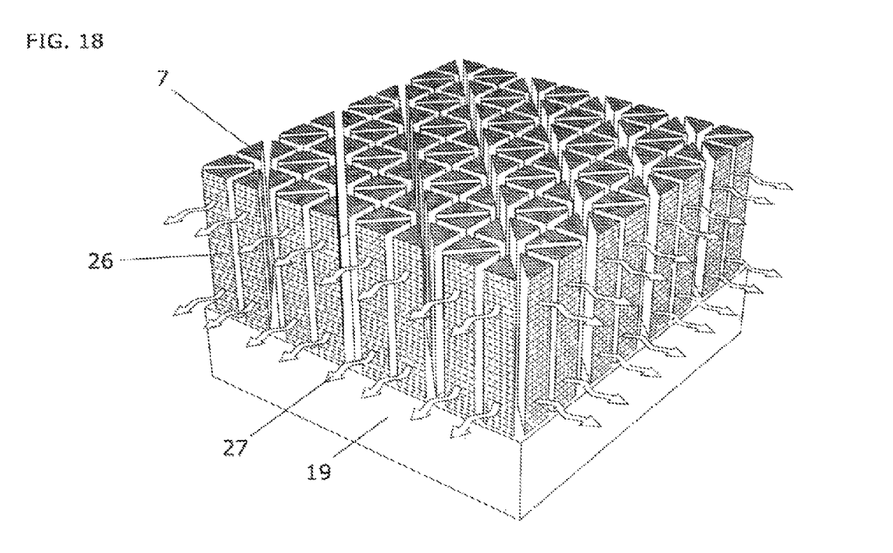
FIG. 18 shows a detail of a stave portion with the geometric pattern of FIG. 3. The transmission of substance from the wood to the liquid which would be contained inside the barrel is represented by arrows and in a conceptual manner.
Figure 19:
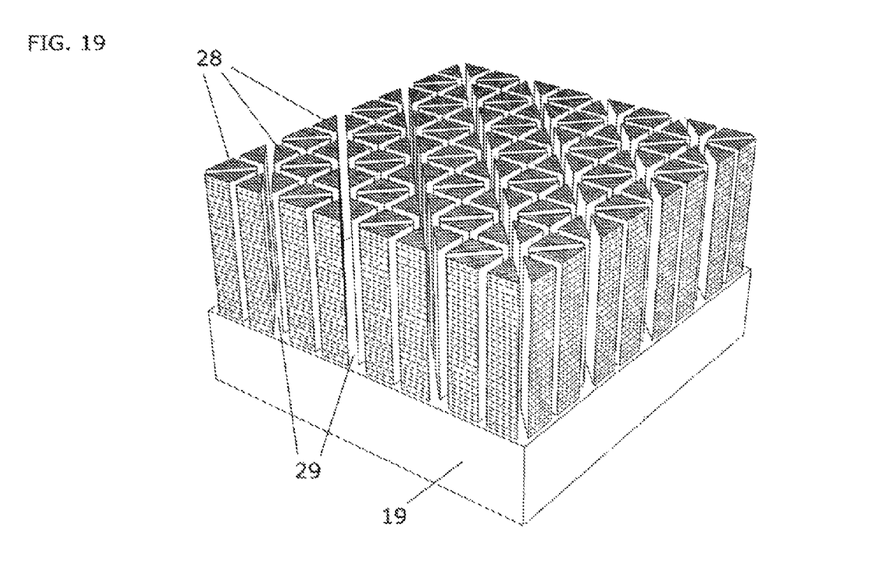
FIG. 19 shows a detail of a stave portion with the geometric pattern of FIG. 3.
Figure 20:
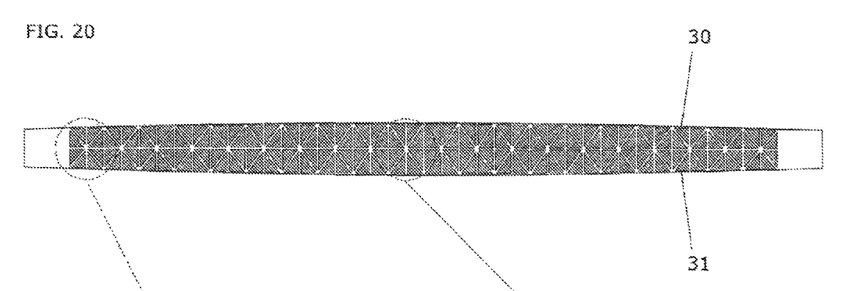
FIG. 20 shows a plan view of a stave with the geometric pattern of FIG. 3.
Figure 21:
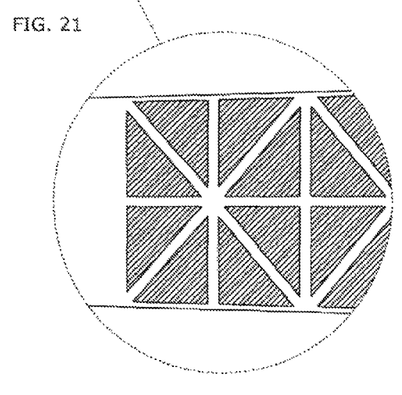
FIG. 21 shows a plan view of a detail of one end of the stave of FIG. 20.
Figure 22:
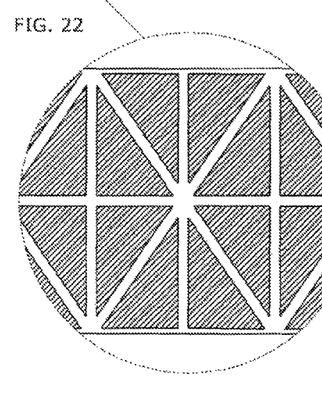
FIG. 22 shows a plan view of a detail of the central area of the stave of FIG. 20.

FIG. 18 shows a detail of an example of a stave where each of the machined elements 7 leave the internal fibres of the wood 26 in the walls thereof exposed, enabling a greater contribution of substance 27 to the contained liquid, since that arrangement of the fibres has a greater permeability.

In addition, the solution proposed for the staves 20 may also be applied for the lids 25 in the internal side thereof of the barrel 22.

As mentioned above, the objective of the channels 3 machined in the internal side of the staves 20, regardless of the arrangement thereof and the geometric elements or prisms they determine, is twofold, on the one hand, to increase the contact surface between the wood and the liquid stored in the barrel 22 formed by said staves, and on the other hand, to enable the barrel to be completely emptied through the liquid entry and exit opening 1 arranged in at least one stave between the staves 20 forming the barrel 22. FIGS. 5 to 8 show different patterns with geometric elements 7 determined by the machined channels 3, centred in the area where the channels 3 meet the entry and exit opening 1 of the barrel 22, in order to more clearly illustrate the condition of ease of emptying, object of the present invention.

In each of FIGS. 5 to 8, four arrows 2 arranged orthogonally are identified, located outside each detail of the stave 20, and which represent the characteristic curvature of a barrel 22 and the exit direction of the liquids contained inside the barrel 22. In each of the figures it is possible to observe in a particular manner by means of arrows arranged in the internal channels 3 thereof, the directions that the liquid follows until the exit thereof from the barrel 22 through the opening 1.

Figure 1:
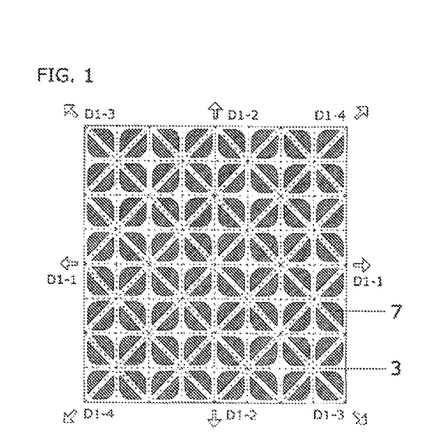
FIG. 1 shows a plan view of a detail of a stave with a first geometric pattern.

Specifically, FIG. 1 shows a detail of a stave 20, used for the examples of FIGS. 9 to 17, adapted and arranged parametrically to the perimeter or contour of the internal side of the stave 20. It consists of a pattern of geometric elements 7 resulting from a framework defined by a certain number of axes, arranged in four directions, a first direction D1-1, a second direction D1-2, a third direction D1-3 and a fourth direction D1-4 and in a parallel and equidistant manner between those corresponding to each direction D1-1, D1-2, D1-3 and D1-4. Two of the four directions, the first and second directions, D1-1 and D1-2 of the framework are orthogonal to each other and preferably coincide with the two main axes of the barrel, the transversal axis (T-T') (axis perpendicular to the larger dimension of a body) and the longitudinal axis (L-L') (axis of a body in the direction with a larger dimension). The other two directions, the third, D1-3 and the fourth, D1-4, also orthogonal to each other, are rotated at an angle which varies depending on the design, but preferably it will be 45° with respect to the first direction D1-1 and second direction D1-2. The axes arranged in a parallel and equidistant manner in each of the four directions D1-1, D1-2, D1-3 and D1-4, meet each other at common intersection points, forming a triangular mesh, the sides thereof being equal in size and shape, in this case right-angled triangles. The machining is performed along the axes of the framework, with the previous first, second, third and fourth directions, D1-1, D1-2, D1-3 and D1-4, creating the channels 3 and giving as a result said geometric elements 7 with an extruded effect on the base thereof, equal in size and shape, forming a pattern of triangular prisms, with bases in the shape of right-angled triangles, where the right angles thereof receive a subsequent curvature treatment.

Said pattern in the application thereof to the stave is preferably adapted and arranged parametrically to the perimeter or contour of the internal side of the stave, such that the axes arranged in a parallel and equidistant manner in each of the four directions D1-1, D1-2, D1-3 and D1-4 can have variations in direction between those corresponding to each of the first, second, third and fourth directions D1-1, D1-2, D1-3 and D1-4, said axes therefore losing the parallel condition thereof, for which reason the resulting triangular mesh will be formed by triangles with different sizes and shapes. The machining is performed along the axes of the framework, with the variations in direction of the previous first, second, third and fourth directions, D1-1, D1-2, D1-3 and D1-4, creating the channels 3 and giving as a result the geometric elements 7 with an extruded effect on the base thereof, with different sizes and shapes, due to the adaptation thereof to the perimeter or contour of the internal side of the stave, where said geometric elements will have, as an alternative, the largest size thereof in the central and wider area of the stave, and they will progressively decrease in size towards the area of the narrower ends, forming a pattern of triangular prisms, with bases in the shape of right triangles, where the right angles thereof receive a subsequent curvature treatment. One option could comprise a certain number of channels parallel and equidistant in a first direction (D1-2), a second channel coinciding with the trajectory of the first longitudinal side 30 of the stave which joins the ends thereof, a third channel coinciding with the trajectory of the second longitudinal side 31 of the stave which joins the ends thereof, a certain number of channels interpolated between the channels coinciding with the trajectories of the first and second longitudinal sides, crossing the previous channels, and another series of channels crossing each other with variations in a third and fourth directions (D1-3 and D1-4) and crossing with respect to the previous channels, forming a pattern of triangular prisms, the bases thereof being right-angled triangles with different sizes and shapes, where the right angles thereof receive a subsequent curvature treatment.

Figure 2:
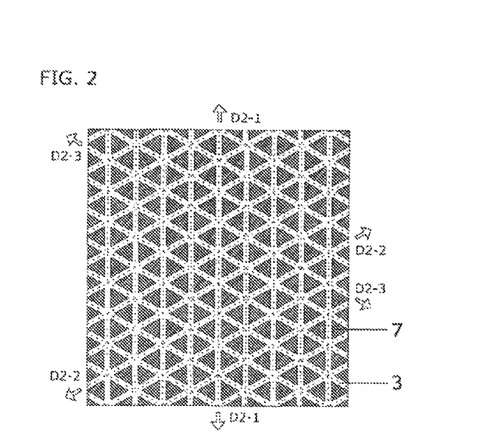
FIG. 2 shows a plan view of a detail of a stave with a second geometric pattern.

A second embodiment presented in FIG. 2 shows a detail of a stave formed by a pattern of geometric elements 7 resulting from a framework defined by a certain number of axes, arranged in three directions, a first direction D2-1, a second direction D2-2 and a third direction D2-3 and in a parallel and equidistant manner between the ones corresponding to each direction D2-1, D2-2 and D2-3. One of the three directions, the first direction D2-1 of the framework, preferably coincides with one of the two main axes of the barrel, the transverse axis (T-T') or the longitudinal axis (L-L'). The axes arranged in an equidistant manner in each of the three directions, the first direction D2-1, the second direction D2-2 and the third direction D2-3, meet each other at common intersection points, forming a triangular mesh, the sides thereof being equal in size and shape, in this case, equilateral triangles. Since the internal angle of an equilateral triangle is 60°, six triangles come together at a point occupying 360°, in other words, a hexagon. The machining is performed along the axes of the framework, creating the first, second and third channels 3 with the previous directions, D2-1, D2-2, D2-3, and giving as a result said geometric elements 7 with an extruded effect on the base thereof, equal in size and shape, forming a pattern of triangular prisms, with bases in the shape of equilateral triangles.

Said pattern in the application thereof to the stave preferably is adapted and arranged parametrically to the shape of the internal side of said stave, such that the axes arranged in a parallel and equidistant manner in each of the three directions D2-1, D2-2 and D2-3 can have variations in direction between those corresponding to each of the first, second and third directions D2-1, D2-2 and D2-3, therefore losing the parallel condition thereof, for which reason the resulting triangular mesh will be formed by triangles with different sizes and shapes. The machining is performed along the axes of the framework, with the variations in direction of the previous first, second and third directions, D2-1, D2-2 and D2-3, creating the channels 3 and giving as a result the geometric elements 7 with an extruded effect on the base thereof, with different sizes and shapes, due to the adaptation thereof to the perimeter or contour of the internal side of the stave, where said geometric elements will have, as an alternative, the largest size thereof in the central and wider area of the stave, and they will progressively decrease in size towards the area of the narrower ends, forming a pattern of triangular prisms, with bases in the shape of triangles. One option could comprise a certain number of channels parallel and equidistant to each other in a first direction (D2-1), a certain number of channels with variations in direction to a second direction (D2-2) and a certain number of channels with variations in direction in a third direction (D2-3), all of them crossing each other, forming a pattern of triangular prisms, the bases thereof being triangles with different sizes and shapes. FIGS. 28 to 31 show four cases of application and parametric arrangement of the geometric mesh of this pattern on a stave.

Figure 3:
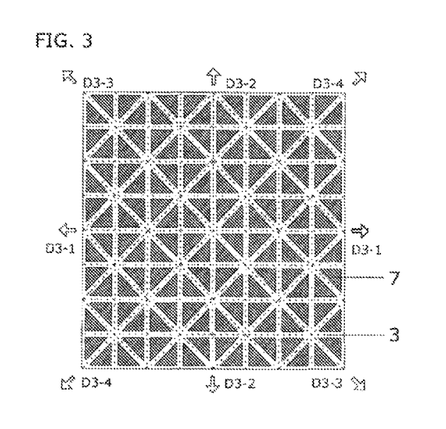
FIG. 3 shows a plan view of a detail of a stave with a third geometric pattern.
Figure 26:
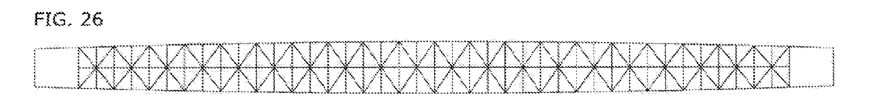
FIG. 26 shows a plan view of a stave corresponding to the mesh of the geometric pattern of FIG. 3, adapted and arranged parametrically to the perimeter or contour of the internal side of the stave, where the two longitudinal sides thereof are curved.
Figure 27:
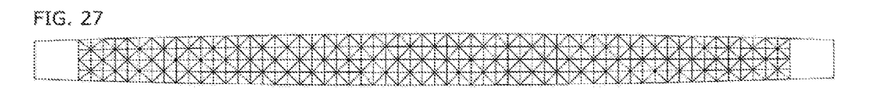
FIG. 27 shows a plan view of a stave corresponding to the mesh of the geometric pattern of FIG. 3, adapted and arranged parametrically to the perimeter or contour of the internal side of the stave, where the two longitudinal sides thereof are curved.
Figure 28:
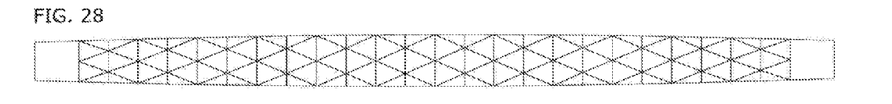
FIG. 28 shows a plan view of a stave corresponding to the mesh of the geometric pattern of FIG. 2, adapted and arranged parametrically to the perimeter or contour of the internal side of the stave, where the two longitudinal sides thereof are curved.
Figure 29:
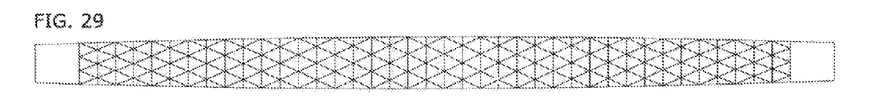
FIG. 29 shows a plan view of a stave corresponding to the mesh of the geometric pattern of FIG. 2, adapted and arranged parametrically to the perimeter or contour of the internal side of the stave, where the two longitudinal sides thereof are curved.
Figure 30:
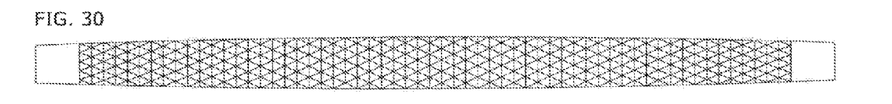
FIG. 30 shows a plan view of a stave corresponding to the mesh of the geometric pattern of FIG. 2, adapted and arranged parametrically to the perimeter or contour of the internal side of the stave, where the two longitudinal sides thereof are curved.
Figure 31:
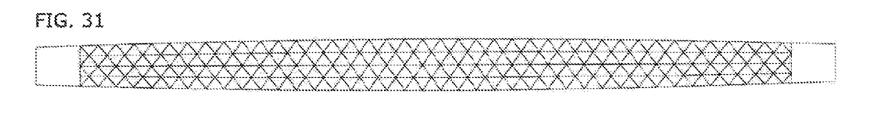
FIG. 31 shows a plan view of a stave corresponding to the mesh of the geometric pattern of FIG. 2, adapted and arranged parametrically to the perimeter or contour of the internal side of the stave, where the two longitudinal sides thereof are curved.

A third embodiment presented in FIG. 3 shows a detail of a stave used for the examples of FIGS. 18 to 19 and FIGS. 20 to 25, being the same as the embodiment of FIG. 1 with the difference of the bases of the geometric elements 7 being triangular prisms with bases in the shape of right-angled triangles, where the right angle thereof does not receive a subsequent curvature treatment. Said pattern in the application thereof to the stave is preferably adapted and arranged parametrically to the perimeter or contour of the internal side of the stave, such that the axes arranged in a parallel and equidistant manner in each of the four directions D3-1, D3-2, D3-3 and D3-4 can have variations in direction between those corresponding to each of the first, second, third and fourth directions D3-1, D3-2, D3-3 and D3-4, said axes therefore losing the parallel condition thereof, for which reason the resulting triangular mesh will be formed by triangles with different sizes and shapes. The machining is performed along the axes of the framework, with the variations in direction of the previous first, second, third and fourth directions, D3-1, D3-2, D3-3 and D3-4, creating the channels 3 and giving as a result the geometric elements 7 with an extruded effect on the base thereof, with different sizes and shapes, due to the adaptation thereof to the perimeter or contour of the internal side of the stave as shown specifically in FIGS. 20 to 25, where said geometric elements will have, as an alternative, the largest size thereof in the central and wider area of the stave (FIG. 22), and they will progressively decrease in size towards the area of the narrower ends of the stave (FIG. 21), forming a pattern of triangular prisms, with bases in the shape of right-angled triangles. In FIGS. 23 to 25 we find an example of adapting said pattern to different options of perimeters or contours of the stave. FIGS. 26 and 27 show two cases of application and parametric arrangement of the geometric mesh of this pattern on a stave.

Figure 4:
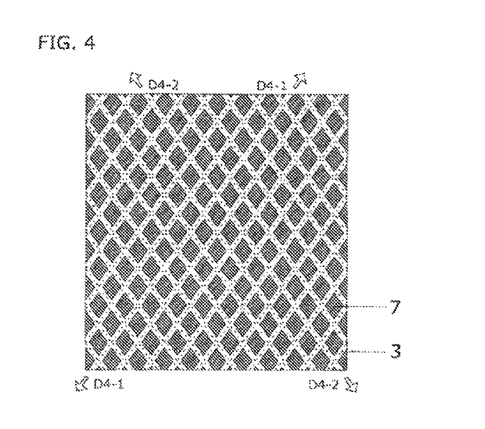
FIG. 4 shows a plan view of a detail of a stave with a fourth geometric pattern.

A fourth embodiment, presented in FIG. 4, shows a detail of a stave formed by a pattern of geometric elements 7 resulting from a framework defined by a certain number of axes, arranged in two directions, a first direction D4-1 and a second direction D4-2 and in a parallel and equidistant manner between the axes corresponding to each direction D4-1 and D4-2, creating a mesh of irregular polygons, in this case of rhombuses. These two directions, first D4-1 and second D4-2, could also be arranged orthogonally to each other and with a rotation preferably of 45° with respect to the main axes of the barrel, the transverse axis (T-T') or longitudinal axis (L-L'), such that the internal diagonals of the polygons of the framework, which join the opposite vertices together, were parallel to the two main axes of the barrel, the transversal axis (T-T') or longitudinal axis (L-L'). The machining is performed along the axes of the framework, creating the first and second channels 3 in the aforementioned directions, D4-1 and D4-2 and giving as a result said geometric elements 7 with an extruded effect on the base thereof, equal in size and shape, forming a pattern of prisms with bases in the shape of rhombuses or squares, according to the angle between the two directions D4-1 and D4-2.

Figure 32:
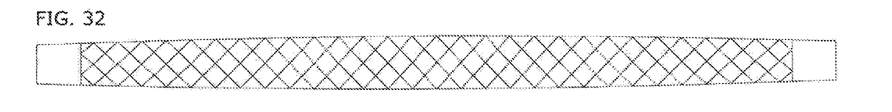
FIG. 32 shows a plan view of a stave corresponding to the mesh of the geometric pattern of FIG. 4, adapted and arranged parametrically to the perimeter or contour of the internal side of the stave, where the two longitudinal sides thereof are curved.
Figure 33:
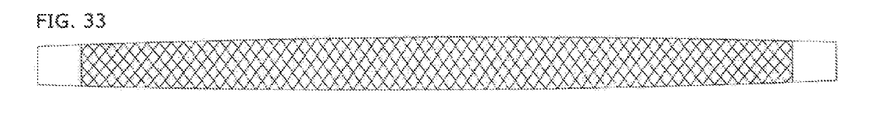
FIG. 33 shows a plan view of a stave corresponding to the mesh of the geometric pattern of FIG. 4, adapted and arranged parametrically to the perimeter or contour of the internal side of the stave, where the two longitudinal sides thereof are curved.

Said pattern in the application thereof to the stave is preferably adapted and arranged parametrically to the shape of the internal side of said stave, such that the axes arranged in a parallel and equidistant manner in each of the two directions D4-1 and D4-2 can have variations in direction between those corresponding to each of the first and second directions D4-1 and D4-2, therefore losing the parallel condition thereof, for which reason the resulting irregular polygon mesh will be formed by rhombuses with different sizes and shapes. The machining is performed along the axes of the framework, with the variations in direction of the previous first and second directions, D4-1 and D4-2, creating the channels 3 and giving as a result the geometric elements 7 with an extruded effect on the base thereof, with different sizes and shapes, due to the adaptation thereof to the perimeter or contour of the internal side of the stave, where said geometric elements will have, as an alternative, the largest size thereof in the central and wider area of the stave, and they will progressively decrease in size towards the area of the narrower ends, forming a pattern of prisms with bases in the shape of rhombuses. FIGS. 32 and 33 show two cases of application and parametric arrangement of the geometric mesh of this pattern on a stave.

FIGS. 5 to 8 show a detail of the staves with an exit opening 1 with the same patterns of FIGS. 1 to 4.

The invention claimed is:

1. A wooden stave (20) for a barrel, with a side at each of the two ends thereof joined together by an internal side, an external side and by two longitudinal sides which determine the length of the stave, wherein the internal side comprises:
   at least two first machined channels,
   at least two second machined channels crossing said first channels,
   a pattern determined by said crossing channels and formed by geometric elements located between the channels,
   the stave (20) having a first surface on the internal side thereof (29) corresponding to a bottom of the channels and second surfaces on the internal side thereof (28) corresponding to tops of the geometric elements, a difference in height between the tops of the geometric elements and the bottom of the channel determining a depth of the channels, and wherein a difference between the first surface of the internal side thereof (29) and the external side determines a base (19) of the stave (20).

2. The stave according to claim 1, comprising a through opening located approximately in a centre thereof which interrupts at least one first channel of the stave.

3. The stave according to claim 1, comprising a third surface on the internal side thereof (4) corresponding to the ends of the stave and a result of a machining for hollowing or removing material.

4. The stave according to claim 1, comprising at least three first channels parallel and equidistant to each other in a first direction (D3-1), at least three second channels parallel and equidistant to each other in a second direction (D3-2), at least two other channels perpendicular to each other in third and fourth directions (D3-3 and D3-4) and crossing with respect to the previous channels in said first and second directions (D3-1 and D3-2), forming a pattern of triangular prisms, the bases thereof being right-angled triangles.

5. The stave according to claim 1, comprising at least three first channels parallel and equidistant in a first direction (D3-2), at least one second channel with a trajectory coinciding with the first longitudinal side (30) of the stave which joins the ends thereof, at least one third channel with a trajectory coinciding with the second longitudinal side (31) of the stave which joins the ends thereof, at least one fourth channel coinciding with a trajectory interpolated between the trajectory of the first longitudinal side (30) of the stave and the trajectory of the second longitudinal side (31) of the stave, at least two other channels crossing each other, with variations in direction to third and fourth directions (D3-3 and D3-4) and crossing with respect to the previous channels, forming a pattern of triangular prisms, the bases thereof being right triangles with different sizes and shapes.

6. The stave according to claim 4 wherein the triangular prisms have the right angles of the bases thereof curved.

7. The stave according to claim 1, comprising at least three first channels parallel and equidistant to each other in a first direction (D2-1), at least three second channels parallel and equidistant to each other in a second direction (D2-2) and at least three third channels parallel and equidistant to each other in a third direction (D2-3), all of them crossing each other, forming a pattern of triangular prisms, the bases thereof being equilateral triangles.

8. The stave according to claim 1, comprising at least three first channels parallel and equidistant to each other in a first direction (D2-1), at least three second channels with variations in direction to a second direction (D2-2) and at least three third channels with variations in direction in a third direction (D2-3), all of them crossing each other, forming a pattern of triangular prisms, the bases thereof being triangles with different sizes and shapes.

9. The stave according to claim 1, comprising at least one first channel with a trajectory coinciding with the first longitudinal side (30) of the stave which joins the ends thereof, at least one second channel with a trajectory coinciding with the second longitudinal side (31) of the stave which joins the ends thereof, at least one third channel coinciding with a trajectory interpolated between the trajectory of the first longitudinal side (30) of the stave and the trajectory of the second longitudinal side (31) of the stave, at least three second channels with variations in direction to a second direction (D2-2) and at least three third channels with variations in direction in a third direction (D2-3), all of them crossing each other, forming a pattern of triangular prisms, the bases thereof being triangles with different sizes and shapes.

10. The stave according to claim 9, wherein the trajectory interpolated between the first longitudinal side (30) of the stave and the second longitudinal side (31) of the stave can be curved or straight.

11. The stave according to claim 1, comprising at least two first channels parallel and equidistant in a first direction (D4-1) and two second channels parallel and equidistant to each other in a second direction (D4-2), which cross with respect to the first channels, forming a pattern of rhomboidal prisms.

12. The stave according to claim 1, comprising at least two first channels with variations in direction to a first direction (D4-1) and at least two second channels with variations in direction to a second direction (D4-2), which cross with respect to the first channels, forming a pattern of rhomboidal prisms.

13. The stave according to claim 11, wherein the second channels parallel to each other cross orthogonally with the first channels.

14. The stave according to claim 1, wherein a width or thickness of the channels, determined between the geometric elements, are equal in each channel.

15. The stave according to claim 1, wherein a width or thickness of the channels, determined between the geometric elements, are not all equal in each channel.

16. The stave according to claim 1, wherein the channels have a same depth.

17. The stave according to claim 1, wherein the channels have different depths.

18. The stave according to claim 1, wherein a depth of each channel is variable along the channel.

19. A wooden barrel formed by staves and two lids arranged at each of the two ends of the staves, c at least one stave according to claim 1.

20. The barrel according to claim 19, wherein the at least one stave comprises a through opening located approximately in a centre thereof which interrupts at least one first channel of the at least one stave.

21. The barrel according to claim 19, wherein the at least one stave comprises a third surface on an internal side thereof corresponding to the ends of the stave, a result of a machining for hollowing or removing material.

22. The barrel according to claim 19, wherein the at least one stave comprises at least three first channels parallel and equidistant to each other in a first direction (D3-1), at least three second channels parallel and equidistant to each other in a second direction (D3-2), at least two other channels perpendicular to each other in third and fourth directions (D3-3 and D3-4) and crossing with respect to the previous channels in said first and second directions (D3-1 and D3-2), forming a pattern of triangular prisms, the bases thereof being right-angled triangles.

23. The barrel according to claim 19, comprising a hole extending from an outside of the barrel to an inside of the barrel, the hole formed in at least one of the staves intermediate the respective two ends and interrupting at least one of the first and second channels of the at least one of the staves.

24. The barrel according to claim 23, wherein the first and second channels of the staves are arranged so that, when the barrel is positioned horizontally on its side with the hole at a lowest point, fluid contained within channels of the barrel will freely flow under gravity to the hole without accumulating inside portions of channels.

* * * * *